(12) United States Patent
Taniguchi et al.

(10) Patent No.: US 11,298,773 B2
(45) Date of Patent: Apr. 12, 2022

(54) RESISTANCE SPOT WELDING METHOD (71) Applicant: JFE Steel Corporation, Tokyo (JP)

(72) Inventors: Koichi Taniguchi, Tokyo (JP);
Chikaumi Sawanishi, Tokyo (JP);
Katsutoshi Takashima, Tokyo (JP);
Hiroshi Matsuda, Tokyo (JP); Rinsei Ikeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 276 days.

(21) Appl. No.: 16/488,703

(22) PCT Filed: Mar. 1, 2018

(86) PCT No.: PCT/JP2018/007809
§ 371 (c)(1),
(2) Date: Aug. 26, 2019

(87) PCT Pub. No.: WO2018/159764
PCT Pub. Date: Sep. 7, 2018

(65) Prior Publication Data
US 2020/0230735 A1    Jul. 23, 2020

(30) Foreign Application Priority Data

Mar. 1, 2017    (JP) .............................. JP2017-038590

(51) Int. Cl.
*B23K 11/11*    (2006.01)
*B23K 11/00*    (2006.01)
(Continued)

(52) U.S. Cl.
CPC ......... *B23K 11/115* (2013.01); *B23K 11/0026* (2013.01); *B23K 11/163* (2013.01); *B23K 2103/04* (2018.08)

(58) Field of Classification Search
CPC ... B23K 11/0026; B23K 11/11; B23K 11/115; B23K 11/163; B23K 11/166; B23K 11/24; B23K 2103/04; B23K 11/16
(Continued)

(56) References Cited

U.S. PATENT DOCUMENTS 5,047,608 A * 9/1991 Takahashi .............. B23K 11/31
219/91.2

FOREIGN PATENT DOCUMENTS

CN          2148631 Y     12/1993
CN        201815791 U      5/2011
(Continued)

OTHER PUBLICATIONS

Extended European Search Report for European Application No. 18 760 585.2, dated Feb. 21, 2020, 7 pages.
(Continued)

*Primary Examiner* — Dana Ross
*Assistant Examiner* — Joseph W Iskra
(74) *Attorney, Agent, or Firm* — RatnerPrestia (57) ABSTRACT

Provided is a resistance spot welding method. The resistance spot welding method for joining a sheet set including a plurality of lapped steel sheets includes: holding the sheet set between a pair of electrodes; and energizing the sheet set under application of electrode force to thereby join the steel sheets together. At least one of the plurality of lapped steel sheets is a surface-treated steel sheet including a metal coating layer on a surface thereof. The energizing includes: a primary energizing step of performing energization to form a nugget portion; a non-energizing step in which, after the primary energizing step, the energization is suspended for an energization suspension time Tc (cycles); and a secondary energizing step of, after the non-energizing step, performing energization for reheating while the nugget portion is pre-
(Continued)

vented from growing. During the energizing, the relations of a particular formula are satisfied.

8 Claims, 1 Drawing Sheet

(51) Int. Cl.
    *B23K 11/16* (2006.01)
    *B23K 103/04* (2006.01)
(58) Field of Classification Search
    USPC ........................................................ 219/91.2
    See application file for complete search history.

(56) References Cited

FOREIGN PATENT DOCUMENTS

| | | |
|---|---|---|
| CN | 102300667 A | 12/2011 |
| CN | 203541838 U | 4/2014 |
| EP | 2392428 A1 | 12/2011 |
| JP | 10195597 A | 7/1998 |
| JP | 2003103377 A | 4/2003 |
| JP | 2003236676 A | 8/2003 |
| JP | 2004330253 A | 11/2004 |
| JP | 2010115706 A | 5/2010 |
| JP | 2011005544 * | 1/2011 |
| JP | 2016068142 A | 5/2019 |
| WO | 2016181996 A1 | 11/2016 |

OTHER PUBLICATIONS

International Search Report and Written Opinion for International Application No. PCT/JP2018/007809 dated Apr. 24, 2018, 4 pages.
Chinese Office Action with Searcj Report for Chinese Application No. 201880014171.6, dated Oct. 29, 2020, 10 pages.

* cited by examiner

RESISTANCE SPOT WELDING METHOD

CROSS REFERENCE TO RELATED APPLICATIONS

This is the U.S. National Phase application of PCT/JP2018/007809, filed Mar. 1, 2018, which claims priority to Japanese Patent Application No. 2017-038590, filed Mar. 1, 2017, the disclosures of these applications being incorporated herein by reference in their entireties for all purposes.

FIELD OF THE INVENTION

The present invention relates to a resistance spot welding method.

BACKGROUND OF THE INVENTION

Figure 1:
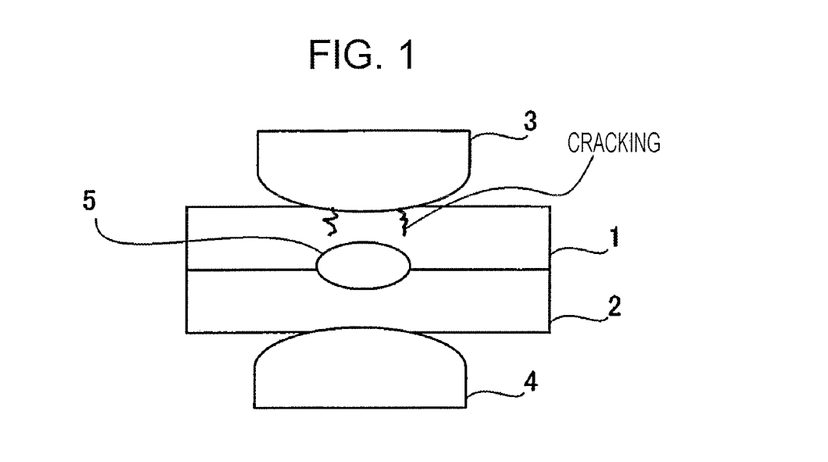
FIG. 1 is an illustration schematically showing an example of a resistance spot welding method.

Generally, a resistance spot welding method, which is one type of lap resistance welding method, is used to join lapped steel plates together. As shown in FIG. 1, in this welding method, two or more lapped steel sheets 1 and 2 are held between a pair of electrodes 3 and 4. While electrode force is applied vertically to the steel sheets 1 and 2 by the electrodes 3 and 4, a high welding current is applied through the upper and lower electrodes for a short time to thereby join the steel sheets 1 and 2 together. A spot weld 5 is obtained by using heat generated by resistance heating due to the flow of the high welding current. The spot weld 5 is referred to as a nugget and is a portion formed as follows. When the current is applied to the lapped steel sheets, the steel sheets 1 and 2 melt at their contact portion and then solidify and are thereby joined together in the form of a spot.

However, a problem with resistance spot welding of a sheet set including a plurality of lapped steel sheets including a surface-treated steel sheet is that cracking may occur in the weld. The surface-treated steel sheet is a steel sheet having a metal coating layer on the surface of a base metal (base steel sheet). Examples of the metal coating include: zinc coatings typified by electrogalvanized coatings and hot-dip galvanized coatings (including hot-dip galvannealed coatings); and zinc alloy coatings containing, in addition to zinc, another element such as aluminum or magnesium. Zinc coatings and zinc alloy coatings have lower melting points than the base metal of the surface-treated steel sheet and have the following problem.

It has been considered that the cracking in the weld is caused by so-called liquid metal embrittlement. Specifically, the low-melting point metal coating layer on the surface of the steel sheet melts during welding. When the electrode force and tensile stress due to thermal expansion and contraction of the steel sheets are applied to the weld, the molten low-melting point metal penetrates into grain boundaries of the base metal of the surface-treated steel sheet and causes a reduction in grain boundary strength, and the cracking thereby occurs. Cracking can occur in various positions such as surfaces of the steel sheets 1 and 2 that are in contact with the electrodes 3 and 4 as shown in FIG. 1 and surfaces of the steel sheets 1 and 2 that are in contact with each other.

To take measures against cracking, Patent, Literature 1, for example, proposes that a sheet set including steel sheets having a composition in specific ranges is used. Specifically, the steel sheets contain, in weight %, C: 0.003 to 0.01%, Mn: 0.05 to 0.5%, P: 0.02% or less, sol. Al: 0.1% or less, Ti: 48×(N/14) to 48×{(N/14)+(S/32)}%, Nb: 93×(C/12) to 0.1%, B: 0.0005 to 0.003%, N: 0.01% or less, and Ni: 0.05% or less, with the balance being Fe and unavoidable impurities.

Patent Literature 2 proposes a method for spot-welding a coated high-strength steel sheet. In the method for spot-welding a coated high-strength steel sheet, the spot welding is performed while weld time and holding time after energization for welding are set so as to satisfy conditions (1) and (2) below. Patent Literature 2 also proposes that welding is performed using high-tensile galvanized steel sheets containing alloying elements in amounts equal to or lower than certain values while the weld time and the electrode holding time after the energization are appropriately set according to the thickness of the steel sheets.

$$0.25 \cdot (10 \cdot t + 2)/50 \leq WT \leq 0.50 \cdot (10 \cdot t + 2)/50 \tag{1}$$

$$300 - 500 \cdot t + 250 \cdot t^2 \leq HT \tag{2}$$

Here, t: sheet thickness (mm), WT: weld time (ms), and HT: holding time (ms) after energization for welding.

Patent Literature 3 proposes a method that uses a multi-stage energization pattern including at least three energization stages. Welding conditions such as the weld time and the welding current are controlled such that an appropriate current range ($\Delta I$: a current range in which a nugget having a diameter equal to or more than a desired nugget diameter can be formed stably while a non-melted portion has a thickness of 0.05 mm or more) is 1.0 kA or more and preferably 2.0 kA or more, and a cooling period is provided between the stages.

A joint obtained by resistance spot welding is also required to have high joint strength such as cross tension strength (strength when a tensile test is performed in the separation distance of the joint).

Patent Literature 4 describes a technique for achieving such a high joint strength. In this technique, a multi-stage energization pattern including at least two stages is used. After a nugget is formed, secondary energization that does not cause the nugget to increase is performed at a higher current value than that in primary energization. It is stated that this can improve the cross tension strength.

Patent Literature

PTL 1: Japanese Unexamined Patent Application Publication No. 10-195597
PTL 2: Japanese Unexamined Patent Application Publication No. 2003-103377
PTL 3: Japanese Unexamined Patent Application Publication No. 2003-236676
PTL 4: Japanese Unexamined Patent Application Publication No. 2010-115706

SUMMARY OF THE INVENTION

However, a problem with Patent Literature 1 is that, since the amounts of the alloying elements in the steel sheets must be limited, usable steel sheets that satisfy the required performance are limited. In particular, since the strength of steel sheets is being increasing recently and the steel sheets are highly alloyed, the application of Patent Literature 1 is extremely limited. Patent Literature 2 proposes only a method for preventing cracking when an excessively high welding current that can cause expulsion is set, and no mention is made of cracking when no expulsion occurs. A problem with the method in Patent Literature 3 is that, since optimization of the welding conditions requires many man hours, the method cannot be applied to steel sheets and sheet sets in which the appropriate current range is not easily maintained. In Patent Literature 4, no mention is made of the cracking described above, and conditions that allow high cross tension strength and prevention of the cracking simultaneously are not described. In Patent Literature 1 to Patent Literature 4, no consideration is made of the influence of the angle of electrodes. Therefore, in consideration of actual operations during assembly of automobiles, their measures are insufficient in some cases.

Aspects of the present invention have been made in view of the foregoing circumstances, and it is an object to provide a resistance spot welding method that can prevent the occurrence of cracking in the weld according to the angle of the electrodes irrespective of the type of steel and can maintain the strength of the joint sufficiently.

To achieve the above object, the inventors have repeated extensive studies. Cracking that occurs during welding can occur even under the welding conditions under which no expulsion occurs. The inventors have found that, although the occurrence of cracking is affected by various factors, the occurrence is particularly significantly affected by an electrode misalignment angle A (degrees) during welding (electrode misalignment angle means an misaligned angle of center axes of the electrodes with respect to the normal to the surface of the steel sheets, see FIG. 2). Therefore, primary energization for forming a nugget portion is performed, and the energization is suspended for a prescribed time. Then secondary energization is performed such that the nugget portion is reheated while the growth of the nugget portion is prevented. In addition, the energization is performed under specific conditions according to, for example, the magnitude of the electrode misalignment angle. The inventors have found that this can prevent cracking and sufficient joint strength can be obtained.

The effects according to aspects of the present invention against cracking that occurs during welding cannot be described simply because various factors exert their influence in a complex manner. However, the basic mechanism may be as follows. One cause of the occurrence of cracking in the weld is that tensile stress described below is generated in the state in which the coating metal of a surface-treated steel sheet heated to high temperature is in contact with the base metal (base steel sheet) of the surface-treated steel sheet. The tensile stress locally increases in some regions when the electrodes are separated from the steel sheets after completion of welding.

During energization, the weld 5 expands, and a surrounding region of the weld 5 is thereby deformed by compressive stress. Then, solidification shrinkage of the weld 5 after completion of the energization causes increase in tensile stress in the surrounding region. However, while the electrodes 3 and 4 apply force on a joint, the stress tends to be compressive or slightly tensile because the weld 5 is constrained by the electrode force. When the constraint by the electrode force is released, the tensile stress locally increases in some regions, and cracking may occur in these regions.

Cracking was evaluated in a state in which various types of disturbance were present. It has been found that, when the electrode misalignment angle A (degrees) is nonzero, in particular, when the electrode misalignment angle A (degrees) is large, cracking is likely to occur. This may be because, when the electrode misalignment angle is nonzero, bending stress acts on the weld and large compressive plastic deformation is generated locally. In this case, the tensile stress after release of the electrodes is very large. As described above, when tensile stress acts on the weld, the molten low-melting point metal penetrates into the grain boundaries of the steel sheets and causes a reduction in grain boundary strength, and cracking thereby occurs.

In this case, when the steel sheets are reheated appropriately, metals such as zinc on the surfaces of the steel sheets are alloyed with other elements in the metal coating layer or in the steel sheets, causing an increase in melting point. Solidification during cooling after reheating is thereby facilitated, so that the amount of the molten metals such as molten zinc that penetrate into the crystal grain boundaries of the steel sheets and cause a reduction in the grain boundary strength is reduced. The inventors have found that this can prevent cracking. The inventors have also found that, by controlling the conditions for reheating, the nugget can be reformed and the cross tension strength (CTS) can be improved.

Aspects of the present invention are based on the findings described above and summarized as follows.

[1] A resistance spot welding method for joining a sheet set including a plurality of lapped steel sheets, the method including: holding the sheet set between a pair of electrodes; and energizing the sheet set under application of electrode force to thereby join the steel sheets together, wherein at least one of the plurality of lapped steel sheets is a surface-treated steel sheet including a metal coating layer on a surface thereof, wherein the energizing includes a primary energizing step of performing energization to form a nugget portion, a non-energizing step in which, after the primary energizing step, the energization is suspended for an energization suspension time Tc (cycles), and a secondary energizing step of, after the non-energizing step, performing energization for reheating while the nugget portion is prevented from growing, and wherein, during the energizing, the relations of the following formula (I) are satisfied:

$(22+A) \cdot B/100 < Ip/Im < C$ when $0 < A < 3$, $(17+A) \cdot B/80 < Ip/Im < C$ when $3 \leq A < 7$, and $(11+A) \cdot B/60 < Ip/Im < C$ when $7 \leq A < 15$,　　formula (I)

where A is an electrode misalignment angle (degrees) of the electrodes, Im is a current value (kA) in the primary energizing step, Ip is a current value (kA) in the secondary energizing step, B is a variable defined as $1+0.1 \cdot Tc$, and C is a variable defined as $1+0.2 \cdot Tc$.

The resistance spot welding method according to [1], wherein, in the non-energizing step, the relations of the following formula (II) are satisfied:

$0 < Tc < (103-A) \cdot t/D$ when $0 < A < 3$, $0 < Tc < 5 \cdot (23-A) \cdot t/D$ when $3 \leq A < 7$, and $0 < Tc < 8 \cdot (17-A) \cdot t/D$ when $7 \leq A < 15$,　　formula (II)

where t is the total thickness (mm) of the plurality of lapped steel sheets, and D is the tip diameter (mm) of the electrodes.

[3] The resistance spot welding method according to [1] or [2], wherein, after the primary energizing step, the non-energizing step and the secondary energizing step are repeated in this order at least twice.

[4] The resistance spot welding method according to any one of [1] to [3], wherein at least one of the plurality of lapped steel sheets has a tensile strength of 590 MPa or more.

Aspects of the present invention can provide a resistance spot welding method that can prevent the occurrence of cracking in the weld irrespective of the type of steel and can provide high joint strength.

DETAILED DESCRIPTION OF EMBODIMENTS OF THE INVENTION

Embodiments of the present invention will next be described specifically.

Aspects of the present invention include a resistance spot welding method for joining a sheet set including a plurality of lapped steel sheets, the method including: holding the sheet set between a pair of electrodes; and energizing the sheet set under application of electrode force to thereby join the steel sheets together. At least one of the plurality of lapped steel sheets is a surface-treated steel sheet including a metal coating layer on a surface thereof. The energizing includes: a primary energizing step of performing energization to form a nugget portion; a non-energizing step in which, after the primary energizing step, the energization is suspended for an energization suspension time Tc (cycles); and a secondary energizing step of, after the non-energizing step, performing energization for reheating while the nugget portion is prevented from growing. During the energizing, the relations of the following formula (I) are satisfied:

$$(22+A) \cdot B/100 < Ip/Im < C \text{ when } 0 < A < 3,$$

$$(17+A) \cdot B/80 < Ip/Im < C \text{ when } 3 \leq A < 7, \text{ and}$$

$$(11+A) \cdot B/60 < Ip/Im < C \text{ when } 7 \leq A < 15, \quad \text{formula (I)}$$

where A is an electrode misalignment angle (degrees) of the electrodes, Im is a current value (kA) in the primary energizing step, Ip is a current value (kA) in the secondary energizing step, B is a variable defined as $1+0.1 \cdot Tc$, and C is a variable defined as $1+0.2 \cdot Tc$.

Figure 2:
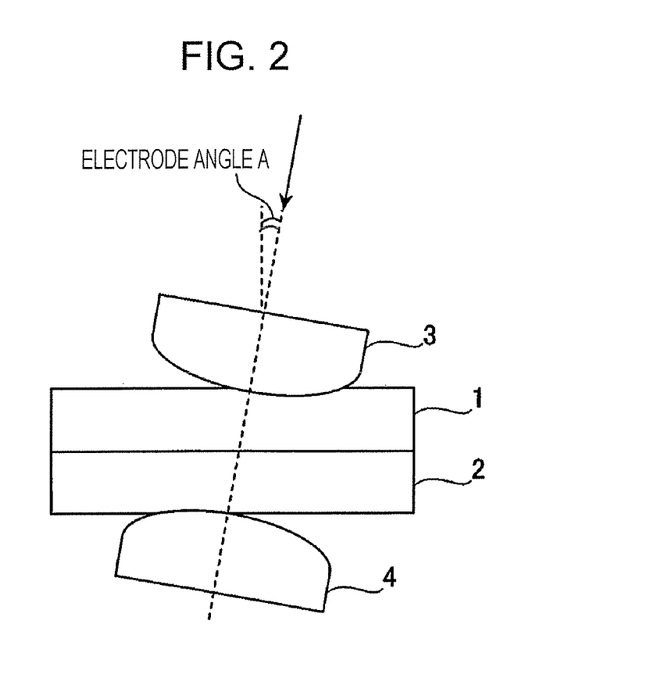
FIG. 2 is an illustration showing an electrode misalignment angle in the resistance spot welding method.

Aspects of the present invention will be described specifically using FIGS. 1 and 2. FIG. 1 is an illustration schematically showing an example of the resistance spot welding method in which two steel sheets are subjected to resistance spot welding. FIG. 2 is an illustration showing an electrode misalignment angle in the resistance spot welding method.

Aspects of the present invention include the resistance spot welding method for joining a sheet set including a plurality of lapped steel sheets, the method including: holding the sheet set between a pair of electrodes; and energizing the sheet set under application of electrode force to thereby join the steel sheets together. First, as shown in FIG. 2, the plurality of steel sheets (a steel sheet 1 and a steel sheet 2) are lapped to form a sheet set.

In accordance with aspects of the present invention, at least one of the steel sheets to be subjected to resistance spot welding is a surface-treated steel sheet having a metal coating layer on its surface. Preferably, the melting point of the metal coating layer is lower than the melting point of a base metal of the surface-treated steel sheet. The melting point of a general metal coating layer is lower than the melting point of each steel sheet. For example, the melting point of the base metal (base steel sheet) is 1,400 to 1,570° C., and the melting point of the metal coating layer is 300 to 1,200° C. No particular limitation is imposed on the metal coating layer, and examples of the metal coating layer include Zn-based coating layers and Al-based coating layers. For components that require corrosion resistance, Zn-based coating layers are better than Al-based coating layers. This is because the sacrificial corrosion protection action of zinc (Zn) can reduce the corrosion rate of the base steel sheet. Examples of the Zn-based coating layers include general hot-dip galvanized coatings (GI), hot-dip galvannealed coatings (GA), electrogalvanized coatings (EG), Zn—Ni-based coatings (e.g., a Zn—Ni-based coating containing 10 to 25% by mass of Ni), Zn—Al-based coatings, Zn—Mg-based coatings, and Zn—Al—Mg-based coatings. Examples of the Al-based coating layers include Al—Si-based coatings (e.g., an Al—Si-based coating containing 10 to 20% by mass of Si). It is only necessary that the metal coating, layer be provided on one side of the surface-treated steel sheet, but the metal coating layer may be provided on both sides. The metal coating layer may be provided on the surface that serves as the joint surface (mating surface) between the steel sheets, may be provided on the surface to be in contact with an electrode, or may be provided on that serves as the joint surface (mating surface) between the steel sheets and on the surface to be in contact with an electrode. The coating weight of the metal coating layer is not limited. From the viewpoint of weldability, the coating weight per side is preferably 120 g/m² or less. In accordance with aspects of the present invention, no particular limitation is imposed on the type (chemical composition) of steel sheet to be subjected to resistance spot welding. A method for producing the steel sheet is not limited, and cold rolling, hot rolling, etc. may be used. Moreover, the microstructure of each steel sheet is not limited. A hot-pressed steel sheet can be used without any problem. No particular limitation is imposed on the thickness of the steel sheet. Preferably, the thickness falls within a range (about 0.5 to about 4.0 mm) that can be used for general automobile bodies.

Preferably, at least one of the steel sheets is a high-strength steel sheet having a tensile strength of 590 MPa or more and 780 MPa or more. When the tensile strength is high, cracking is likely to occur. By applying aspects of the present invention to a sheet set including at least one steel sheet having a tensile strength of 590 MPa or more, the effects according to aspects of the present invention are obtained significantly. In particular, when the sheet set includes at least one steel sheet having a tensile strength of 780 MPa or more, the effects obtained are higher.

The plurality of lapped steel sheets may be of the same type or different types. A plurality of steel sheets of the same type may be lapped, or a plurality of steel sheets of different types may be lapped. Steel sheets having different thicknesses can be used without any problem. A surface-treated steel sheet having a metal coating layer and a steel sheet having no metal coating layer may be lapped. In the example shown in FIG. 2, two steel sheets are lapped, but three or more steel sheets may be lapped.

Next, the sheet set including the plurality of lapped steel sheets is held between a pair of welding electrodes (electrodes 3 and 4) and energized under application of electrode force, and then the electrodes are released from the steel sheets. The welding machine that can be used for the resistance spot welding method according to aspects of the present invention is any welding machine that includes a vertical pair of electrodes and can perform welding while the electrode force and the welding current are controlled freely.

No particular limitation is imposed on the pressurizing mechanism (such as an air cylinder or a servo motor) of the welding machine, its type (e.g., a stationary or robot gun type), and the shape of the electrodes. Aspects of the present invention can be applied to both DC and AC welding machines, and no particular limitation is imposed on the type of power source (a single-phase AC type, an AC inverter type, or a DC inverter type). When AC is used, the "current" means the "effective current." No particular limitation is imposed on the shape of the electrodes. Examples of the type of electrode tip include a DR type (dome radius type), an R type (radius type), and a D type (dome type) specified in JIS C9304: 1999. The tip diameter of the electrodes is, for example, 4 mm to 16 mm, and the radius of curvature of the tips of the electrodes is, for example, 10 mm to 100 mm. The resistance spot welding is performed while the electrodes are always water-cooled.

As described above, the sheet set including the plurality of lapped steel sheets (the steel sheets 1 and 2) is held between the pair of welding electrodes (the electrodes 3 and 4) and energized under application of electrode force. A nugget is thereby formed by heat generated by resistance heating, and the lapped steel sheets are joined together, whereby a joint is obtained.

In accordance with aspects of the present invention, a specific energizing pattern is used, which includes the primary energizing step, the non-energizing step performed after the primary energizing step, and the secondary energizing step performed after the non-energizing step. After completion of the secondary energizing step, the energization is stopped.

The primary energizing step is a step for forming a nugget portion that solidifies to form a nugget 5. No particular limitation is imposed on the energizing and pressurizing conditions for forming the nugget portion, and conventionally used welding conditions can be used. The "nugget" is a fused and solidified portion in a weld during lap resistance welding, and the "nugget portion" is a fused portion that solidifies to form the nugget (i.e., the fused portion before solidification).

The non-energizing step is performed subsequent to the primary energizing step and is a step in which the energization is suspended for the energization suspension time Tc (cycles). When the energization is suspended, the nugget portion is cooled. Here, one cycle is 20 ms (50 Hz).

The secondary energizing step is performed subsequent to the non-energizing step and is a step in which the nugget portion is reheated while prevented from growing.

The welding conditions in accordance with aspects of the present invention are set such that the relations of formula (I) above are satisfied. In formula (I), A is the electrode misalignment angle (degrees) of the electrodes, and Im is the current value (kA) in the primary energizing step. Ip is the current value (kA) in the secondary energizing step. B is a variable defined as $1+0.1 \cdot Tc$, and C is a variable defined as $1+0.2 \cdot Tc$. As described above, the electrode misalignment angle A is the inclination angle of the core axis of the electrode 3 with respect to the normal to the surface of the steel sheet 1 shown in FIG. 2, i.e., "the angle between the direction of the electrode force by the electrodes and the direction of the thickness of the steel sheets." The direction of the electrode force by the electrodes is the direction indicated by an arrow in an illustration of spot welding shown in JIS Z 3001-6:2013 4.2.1 and is also indicated by an arrow in FIG. 2. As described above, the primary energizing step for forming the nugget portion, the non-energizing step in which the energization is suspended for a prescribed time, and the secondary energizing step in which the nugget portion is reheated while prevented from growing are provided in this order, and the energization is performed under specific conditions according to the magnitude of the electrode misalignment angle A etc. In this case, even when the electrode misalignment angle A is larger than 0 degrees, for example, when the electrode misalignment angle A is 0.2 (degrees) or more, cracking can be prevented, and sufficient joint strength can be obtained.

As described above, when the electrode misalignment angle is nonzero, bending stress acts on the weld, and large compressive plastic deformation is generated locally. In this case, the tensile stress after release of the electrodes is very large, and this causes cracking to occur. One effective way to prevent the occurrence of cracking when the electrode misalignment angle is large is to facilitate alloying in the coating layer on the surface layer of the steel sheet to thereby reduce the amount of metals such as molten zinc.

From the viewpoint of obtaining the weld, the electrode misalignment angle A is 15 degrees of less. This is because, if the electrode misalignment angle A exceeds 15 degrees, it is difficult to form the weld itself.

Specifically, when the electrode misalignment angle A is in the range of more than 0 degrees and less than 3 degrees, the bending stress applied to the weld due to the electrode misalignment angle is relatively small, and therefore the tensile stress generated after the release of the electrodes is not so large. In this case, metals such as molten zinc in the coating layer on the surface of the steel sheet may be alloyed only to a limited extent.

When the electrode misalignment angle A is in the range of 3 degrees or more and less than 7 degrees, the rate of increase (the amount of increase) in the tensile stress generated in the weld after the release of the electrodes becomes significant as the electrode misalignment angle increases. In this case, it is necessary to perform the secondary energizing step using a higher current in order to facilitate the alloying.

When the electrode misalignment angle A is in the range of 7 degrees or more and less than 15 degrees, the tensile stress generated in the weld is very large. In this case, it is necessary to perform the secondary energizing step using a higher current in order to facilitate the alloying. By shortening the energization suspension time (cooling time) in the non-energizing step performed before the secondary energizing step, the alloying effect by secondary heating (reheating) can be obtained effectively, as described later.

When the electrode misalignment angle A is 15 degrees or more, it is difficult to perform welding itself. Therefore, when the electrode misalignment angle A is 15 degrees or more in formula (I) above, it is preferable to revise the welding method.

When an excessively high secondary energization current is used in the secondary energizing step, expulsion occurs, and this causes a reduction in joint strength. The heat generation in the secondary energization is determined by the diameter of the nugget formed in the primary energization, and the upper limit of the secondary energization current in the secondary energization can be determined in relation to the primary energization. When the energization suspending step is prolonged, the temperature of the joint decreases, and its specific resistance decreases accordingly. Therefore, the secondary energization current in the secondary energizing step is determined using its ratio to the current in the primary energization, and the upper limit of the secondary energization current is determined in relation to Tc.

The relational expressions in formula (I) above have been obtained by comprehensive examination of above issues. As for the coefficients in the relational expressions, optimal coefficients were determined experimentally.

In accordance with aspects of the present invention, when the energization is performed such that the relations in formula (I) above are satisfied, the occurrence of cracking in the weld can be prevented irrespective of the type of steel, and high joint strength can be obtained. From the viewpoint of obtaining stability of the mode of facture, it is preferable that formula (I) above satisfies the following relations. The stability of the mode of facture means whether plug fracture is stably obtained in a cross tension test.

$$(22+A) \cdot B/80 < Ip/Im < 1+0.15 \cdot Tc \text{ when } 0 < A < 3$$

$$(17+A) \cdot B/64 < Ip/Im < 1+0.15 \cdot Tc \text{ when } 3 \le A < 7$$

$$(11+A) \cdot B/48 < Ip/Im < 1+0.15 \cdot Tc \text{ when } 7 \le A < 15$$

In accordance with aspects of the present invention, it is preferable that the relations of the following formula (II) are satisfied in addition to the relations of formula (I) above. In formula (II), t is the total thickness (mm) of the plurality of lapped steel sheets (the sum of the thicknesses of the plurality of lapped steel sheets), and D is the tip diameter (mm) of the electrodes (the diameter of the tips of the electrodes). When formula (II) is satisfied, the occurrence of cracking can be prevented more effectively, and sufficient joint strength can be obtained.

$$0 < Tc < (103-A) \cdot t/D \text{ when } 0 < A < 3,$$

$$0 < Tc < 5 \cdot (23-A) \cdot t/D \text{ when } 3 \le A < 7,$$

$$0 < Tc < 8 \cdot (17-A) \cdot t/D \text{ when } 7 \le A < 15. \quad \text{Formula (II)}$$

As described above, when the electrode misalignment angle A is in the range of more than 0 degrees and less than 3 degrees, the bending stress applied to the weld due to the electrode misalignment angle is relatively small, and therefore the tensile stress generated after the release of the electrodes is not so large. Therefore, metals such as molten zinc in the coating layer on the surface of the steel sheet may be alloyed only to a limited extent. In this case, even when the energization suspension time Tc (cycles) in the non-energizing step is increased, the effect of preventing cracking in the secondary energizing step can be obtained.

When the electrode misalignment angle A is in the range of 3 degrees or more and less than 7 degrees, the rate of increase (the amount of increase) in the tensile stress generated in the weld after the release of the electrodes becomes significant as the electrode misalignment angle increases. Therefore, it is preferable to facilitate alloying by performing the secondary energizing step using a higher current and by shortening the energization suspension in the non-energizing step performed before the secondary energizing step such that the energization suspension is shorter than that when the electrode misalignment angle A is in the range of more than 0 degrees and less than 3 degrees. In this manner, the effects of alloying can be effectively obtained.

When the electrode misalignment angle A is in the range of 7 degrees or more and less than 15 degrees, the tensile stress generated in the weld is very large. In this case, by reducing the energization suspension time in the non-energizing step performed before the secondary energizing step such that the energization suspension time is shorter than that when the electrode misalignment angle A is in the range of more than 0 degrees and less than 3 degrees, the effect of alloying by the secondary heating (reheating) can be obtained effectively.

Moreover, when the energization suspension time (cooling time) Tc in the non-energizing step is long and the current value Ip in the secondary energizing step is smaller than a prescribed value, the nugget is rapidly cooled and hardened, and its toughness may be reduced. However, when formula (II) above is satisfied, the rapid cooling and hardening can be suppressed.

When the total thickness t (mm) of the steel sheets to be welded is large or the tip diameter D (mm) of the electrodes is small, heat removal to the electrodes is not sufficient, and the cooling rate of the weld is reduced. In this case, it is preferable to use a long energization suspension time Tc (cycles) in the non-energizing step. The energization suspension time Tc is preferably 4 cycles (50 Hz) or longer.

If the non-energizing step is excessively long, the weld is cooled excessively. In this case, since the specific resistance is reduced, and the effects of the secondary energizing step are not easily obtained. The excessively long non-energizing step may increase the takt time of welding. Therefore, the non-energizing step is preferably 20 cycles (50 Hz) or shorter.

No particular limitation is imposed on the tip diameter D (mm) of the electrodes. The tip diameter is preferably, for example, 6 mm to 8 mm. If the tip diameter is less than 6 mm, the nugget obtained may be insufficient. If the tip diameter is more than 8 mm, the electrode may tend to wear during the production welding.

As described above, in accordance with aspects of the present invention, the welding is performed such that formula (I) or formulas (I) and (II) are satisfied. Specifically, for example, the welding conditions are determined using the above formulas classified according to the angle A (degrees) of the electrodes, and the welding is performed using the determined welding conditions. In this manner, the occurrence of cracking can be easily prevented, and sufficient joint strength can be easily obtained.

In accordance with aspects of the present invention, after the primary energizing step, the energization suspending step and the secondary energizing step may be repeated in this order at least twice. By repeating the energization suspending step and the secondary energizing step at least twice, the alloying on the surface of the steel sheets is facilitated, and the effect of preventing cracking can be further improved. The larger the number of repetitions, the more preferable. However, this cause an increase in production cost. From the viewpoint of working efficiency, the number of repetitions is preferably 1 to 9.

In the present description, formulas (I) and (II) define only numerical relations.

No particular limitation is imposed on the welding current value (the current value during energization) in accordance with aspects of the present invention. The welding current is, for example, 4 to 18 kA. It is operationally necessary to obtain a prescribed nugget diameter, and an excessively large current value may cause expulsion. Therefore, the current value Im (kA) in the primary energizing step is, for example, 4 to 11 kA, and the current value Ip (kA) in the secondary energizing step is, for example, 5 to 12 kA.

Preferably, the electrode force is, for example, 2,000 N to 7,000 N (2 kN to 7 kN).

No particular limitation is imposed on the time (weld time) from the start of the energization to the end of the energization. The weld time in the primary energizing step is preferably 8 cycles to 30 cycles (50 Hz), and the weld time in the secondary energizing step is preferably 3 cycles to 10 cycles (50 Hz).

In accordance with aspects of the present invention, a controlling method in which parameters such as resistance and voltage values during welding are monitored to change the current value and the weld time according to the changes in the parameters may be used without any problems.

With the resistance spot welding method according to aspects of the present invention, a weld joint composed of a plurality of welded steel sheets including at least one surface-treated steel sheet having a metal coating layer on its surface can be obtained. Specifically, a weld joint can be produced by a production method including: the step of lapping a plurality of steel sheets including at least one surface-treated steel sheet having a metal coating layer on its surface to thereby obtain a sheet set; and the step of welding the sheet set using the above-described resistance spot welding method. When the above-described resistance spot welding method is used for welding, the occurrence of cracking in the weld can be prevented, and sufficient joint strength can be obtained. Therefore, a weld joint in which the occurrence of cracking in the weld is reduced and which has high joint strength can be produced.

EXAMPLES

To further facilitate the understanding of the present invention, aspects of the invention will be described by way of Examples. However, these Examples do not limit the present invention.

Inventive Examples and Comparative Examples

Examples of the present invention will next be shown. In accordance with aspects of the present invention, two or more steel sheets may be lapped together to form a sheet set. In some Examples, two steel sheets 1 and 2 were lapped together and held between a pair of electrodes 3 and 4 as shown in FIG. 1, and resistance spot welding was performed under prescribed conditions to produce a weld joint. In the other Examples, a sheet set prepared by lapping three steel sheets (steel sheets 1, 2, and 3) together was used to produce a weld joint in a similar manner. The sheet set in this case was prepared, for example, by lapping the steel sheet 3 on the lower side of the steel sheet 2 shown in FIG. 1.

The tensile strength TS and thickness of each of the steel sheets used and the type of coating are shown in Table 1. The welding conditions are shown in Tables 2-1, 2-2, and 2-3.

The welding machine used is an inverter DC resistance spot welding machine, and the two electrodes 3 and 4 have the same shape. The electrodes 3 and 4 used are each a DR-type chromium-copper electrode having a radius of curvature of 40 mm and a tip diameter D (mm) shown in Tables 2-1, 2-2 and 2-3. The resistance spot welding was performed at room temperature (20° C.) while the electrodes were always water-cooled. The electrode force (kN) was held constant over the primary energizing step, the non-energizing step, and the secondary energizing step. The holding time after completion of the secondary energizing step was set to 5 ms for all the welding conditions.

The melting points of the base metals of the steel sheets in the Examples and Comparative Examples are in the range of 1,400 to 1,570° C., and the melting points of galvanized coatings (GI) and galvannealed coatings (GA) are in the range of 400 to 500° C. and the range of 600 to 950° C., respectively. The tensile strength TS (MPa) of each steel sheet shown in Table 1 was determined as follows. A JIS No. 5 tensile test piece of the steel sheet that extends in a direction parallel to its rolling direction was prepared. Then the test piece was subjected to a tensile test according to JIS Z 2241:2011 to determine the tensile strength.

For each of the weld joints obtained, (1) the presence of cracking in the weld and (2) the form of fracture in a cross tension test were evaluated. For some of the weld joints, (3) the stability of the fracture mode in the cross tension test was also evaluated.

(1) Evaluation of Presence of Cracking in Weld

For each of the weld joints obtained, the weld was cut, and a cross section was mirror-polished and observed under a scanning electron microscope (magnification: 2,000×) to check the presence of cracking in the surface layer of the steel sheet around the weld. When no cracking was found in the weld, an evaluation symbol O was assigned. When cracking was found, an evaluation symbol x was assigned.

(2) Evaluation of Fracture Mode in Cross Tension Test

Each of the weld joints obtained was subjected to a cross tension test according to JIS Z 3137, and the diameter of the fractured portion was measured using a vernier caliper. The cross section was cut and etched with picric acid, and the diameter of the fused portion was measured in the cross section. The fracture mode in this case is plug fracture, and the fracture propagates to the base metal. When the ratio of the diameter of the fractured portion to the diameter of the fused portion was 110% or more, an evaluation symbol ⊙ was assigned. When the ratio of the diameter of the fractured portion to the diameter of the fused portion was 100% or more and less than 110%, an evaluation symbol ○ was assigned. When the ratio of the diameter of the fractured portion to the diameter of the fused portion was less than 100%, i.e., when partial plug fracture or interfacial fracture in the nugget occurred, an evaluation symbol x was assigned.

(3) Evaluation of Stability of Fracture Mode in Cross Tension Test

For each of the Examples in which the ratio of the diameter of the fractured portion to the diameter of the fused portion was 110% or more in the evaluation results in (2), the stability of the fracture mode during the CTS was evaluated. 10 samples were produced for each weld joint used for the evaluation under the conditions shown in Tables 1, 2-1, 2-2, and 2-3. For each of the weld joint samples obtained, the diameter of the fractured portion and the diameter of the fused portion were determined by the same method as that shown in (2) above. The results were rated according to the following criteria, and one of the following rating symbols was assigned. The rating symbols A and B represent excellent, and the rating symbol C represents good.

A rating: In 10 out of the 10 samples, the ratio of the diameter of the fractured portion to the diameter of the fused portion is 115% or more.

B rating: In 5 to 9 out of the 10 samples, the ratio of the diameter of the fractured portion to the diameter of the fused portion is 115% or more.

C rating: In 1 to 4 out of the 10 samples, the ratio of the diameter of the fractured portion to the diameter of the fused portion is 115% or more.

The results obtained are shown in Tables 2-1, 2-2, and 2-3.

As can be seen from Tables 2-1, 2-2, and 2-3, in the Inventive Examples in which the welding conditions satisfying the invention were used, good ratings (the symbol ○ or ⊙) were assigned. Specifically, the occurrence of cracking in the weld was prevented, and high joint strength was obtained.

TABLE 1

| Steel sheet No. | Tensile strength TS (MPa) | Thickness (mm) | Type of coating |
|---|---|---|---|
| a | 1020 | 1.0 | Hot-dip galvannealed coating (GA) |
| b | 1012 | 1.4 | Hot-dip galvannealed coating (GA) |
| c | 1032 | 1.4 | Hot-dip galvanized coating (GI) |
| d | 992 | 2.3 | Hot-dip galvannealed coating (GA) |
| e | 1502 | 1.4 | Hot-dip galvannealed coating (GA) |
| f | 1992 | 1.4 | Hot-dip galvannealed coating (GA) |
| g | 1230 | 1.6 | Hot-dip galvannealed coating (GA) |
| h | 781 | 2.0 | Hot-dip galvannealed coating (GA) |
| i | 1344 | 2.0 | Cold rolled steel sheet |
| j | 601 | 1.6 | Hot-dip galvannealed coating (GA) |
| k | 1223 | 1.5 | Electrogalvanized coating (EG) |
| l | 1241 | 1.8 | Al-based coated steel sheet |

TABLE 2-1

| No. | Steel sheet 1 | Steel sheet 2 | Steel sheet 3 | Total sheet thickness t (mm) | Electrode misalignment angle A (degrees) | Tip diameter of electrode D (mm) | Electrode force (kN) | Primary energizing step Current value Im (kA) | Primary energizing step Energizing time (cyc) | Non-energizing step Energization suspension time Tc (cyc) | Secondary energizing step Current value Ip (kA) | Secondary energizing step Energizing time (cyc) | Number of repetitions of non-energizing and secondary energizing steps | Ip/Im | B value (*5) | Formula (I) applied | Presence of cracking (*2) | Fracture mode during cross tension test (*3) | Stability of fracture mode (*4) | Remarks |
|---|---|---|---|---|---|---|---|---|---|---|---|---|---|---|---|---|---|---|---|---|
| 1 | b | b | — | 2.8 | 2 | 6 | 3.5 | 6.0 | 14 | 10 | 7.0 | 10 | 1 | 1.17 | 2.0 | (22 + A) · B/100 < Ip/Im < C | ○ | ⊚ | B | Inventive Example |
| 2 | b | b | — | 2.8 | 2 | 6 | 3.5 | 6.0 | 14 | 50 | 26.0 | 3 | 1 | 4.33 | 6.0 | (22 + A) · B/100 < Ip/Im < C | ○ | ○ | — | Inventive Example |
| 3 | b | b | — | 2.8 | 5 | 6 | 3.5 | 6.0 | 14 | 1 | 5.4 | 5 | 1 | 0.90 | 1.1 | (17 + A) · B/80 < Ip/Im < C | ○ | ⊚ | B | Inventive Example |
| 4 | b | b | — | 2.8 | 5 | 6 | 3.5 | 6.0 | 14 | 4 | 7.0 | 3 | 1 | 1.17 | 1.4 | (17 + A) · B/80 < Ip/Im < C | ○ | ⊚ | B | Inventive Example |
| 5 | b | b | — | 2.8 | 5 | 6 | 3.5 | 6.0 | 14 | 8 | 9.0 | 3 | 1 | 1.50 | 1.8 | (17 + A) · B/80 < Ip/Im < C | ○ | ⊚ | B | Inventive Example |
| 6 | b | b | — | 2.8 | 5 | 6 | 3.5 | 6.0 | 14 | 20 | 15.0 | 3 | 1 | 2.50 | 3.0 | (17 + A) · B/80 < Ip/Im < C | ○ | ⊚ | B | Inventive Example |
| 7 | b | b | — | 2.8 | 5 | 6 | 3.5 | 6.0 | 14 | 4 | 19.0 | 3 | 1 | 3.17 | 1.4 | (17 + A) · B/80 < Ip/Im < C | | | | |
| 8 | b | b | — | 2.8 | 5 | 6 | 3.5 | 6.0 | 14 | 8 | 19.0 | 5 | 1 | 3.17 | 1.8 | (17 + A) · B/80 < Ip/Im < C | | | | |
| 9 | b | b | — | 2.8 | 7 | 6 | 3.5 | 6.0 | 14 | 4 | 8.0 | 5 | 1 | 1.33 | 1.4 | (11 + A) · B/60 < Ip/Im < C | | | | |
| 10 | b | b | — | 2.8 | 7 | 6 | 3.5 | 6.0 | 14 | 10 | 8.0 | 5 | 1 | 1.33 | 2.0 | (11 + A) · B/60 < Ip/Im < C | | | | |
| 11 | a | a | — | 2.0 | 5 | 6 | 3.5 | 6.0 | 14 | 8 | 8.0 | 4 | 1 | 1.33 | 1.8 | (17 + A) · B/80 < Ip/Im < C | | | | |
| 12 | c | c | — | 2.0 | 5 | 6 | 3.5 | 6.0 | 14 | 8 | 16.0 | 4 | 1 | 2.67 | 1.8 | (17 + A) · B/80 < Ip/Im < C | | | | |
| 13 | c | c | — | 2.8 | 5 | 6 | 3.5 | 6.0 | 14 | 4 | 7.0 | 3 | 1 | 1.17 | 1.4 | (17 + A) · B/80 < Ip/Im < C | | | | |
| 14 | c | c | — | 2.8 | 5 | 6 | 3.5 | 6.0 | 14 | 4 | 19.0 | 5 | 1 | 3.17 | 1.4 | (17 + A) · B/80 < Ip/Im < C | | | | |
| 15 | d | d | — | 4.6 | 5 | 6 | 4.5 | 6.0 | 18 | 4 | 7.0 | 5 | 1 | 1.17 | 1.4 | (17 + A) · B/80 < Ip/Im < C | | | | |
| 16 | d | d | — | 4.6 | 5 | 6 | 4.5 | 6.0 | 18 | 4 | 19.0 | 3 | 1 | 3.17 | 1.4 | (17 + A) · B/80 < Ip/Im < C | | | | |
| 17 | e | e | — | 2.8 | 5 | 6 | 4.5 | 6.5 | 18 | 4 | 7.0 | 3 | 1 | 1.08 | 1.4 | (17 + A) · B/80 < Ip/Im < C | | | | |
| 18 | e | e | — | 2.8 | 5 | 6 | 4.5 | 6.5 | 18 | 4 | 19.0 | 5 | 1 | 2.92 | 1.4 | (17 + A) · B/80 < Ip/Im < C | | | | |
| 19 | f | f | — | 2.8 | 5 | 6 | 4.5 | 6.5 | 18 | 4 | 7.0 | 3 | 1 | 1.08 | 1.4 | (17 + A) · B/80 < Ip/Im < C | | | | |
| 20 | f | f | — | 2.8 | 5 | 6 | 4.5 | 6.5 | 18 | 8 | 19.0 | 5 | 1 | 2.92 | 1.8 | (17 + A) · B/80 < Ip/Im < C | | | | |
| 21 | a | a | — | 2.0 | 5 | 6 | 3.5 | 6.0 | 14 | 4 | 8.0 | 4 | 3 | 1.33 | 1.4 | (17 + A) · B/80 < Ip/Im < C | | | | |
| 22 | a | a | — | 2.0 | 5 | 6 | 3.5 | 6.0 | 14 | 8 | 8.0 | 4 | 5 | 1.33 | 1.8 | (17 + A) · B/80 < Ip/Im < C | | | | |
| 23 | d | d | — | 4.6 | 5 | 6 | 4.5 | 6.0 | 18 | 8 | 7.0 | 4 | 9 | 1.17 | 1.8 | (17 + A) · B/80 < Ip/Im < C | | | | |
| 24 | d | d | — | 4.6 | 5 | 6 | 4.5 | 6.0 | 14 | 4 | 7.0 | 3 | 5 | 1.17 | 1.4 | (17 + A) · B/80 < Ip/Im < C | | | | |
| 25 | d | d | — | 4.6 | 5 | 6 | 4.5 | 6.0 | 18 | 4 | 7.0 | 3 | 9 | 1.17 | 1.4 | (17 + A) · B/80 < Ip/Im < C | | | | |

| | Lower limit of Ip/Im in formula (I) applied | Upper limit of Ip/Im in formula (I) applied (C value) | Preferred lower limit of Ip/Im in formula (I) applied (*6) | Preferred upper limit of Ip/Im in formula (I) applied (*6) | Formula (II) applied | Right-hand side of formula (II) applied (cyc) | Formula (*1) | Preferred range of formula (*1) | Formula (II) (*1) |
|---|---|---|---|---|---|---|---|---|---|
| 1 | 0.48 | 3 | 0.6 | 2.5 | 0 < Tc < (103 − A) · t/D | 47.1 | ○ | ○ | ○ |
| 2 | 1.44 | 11 | 1.8 | 8.5 | 0 < Tc < (103 − A) · t/D | 47.1 | ○ | ○ | X |
| 3 | 0.3025 | 1.2 | 0.3781 | 1.15 | 0 < Tc < 5 · (23 − A) · t/D | 42.0 | ○ | ○ | ○ |
| 4 | 0.385 | 1.8 | 0.4813 | 1.6 | 0 < Tc < 5 · (23 − A) · t/D | 42.0 | ○ | ○ | ○ |
| 5 | 0.495 | 2.6 | 0.6188 | 2.2 | 0 < Tc < 5 · (23 − A) · t/D | 42.0 | ○ | ○ | ○ |
| 6 | 0.825 | 5 | 1.0313 | 4 | 0 < Tc < 5 · (23 − A) · t/D | 42.0 | ○ | ○ | ○ |

TABLE 2-1-continued

| | | | | | | (*1) | (*1) | (*2) | (*3) | (*4) | |
|---|---|---|---|---|---|---|---|---|---|---|---|
| 7 | 0.385 | 1.8 | 0.4813 | 1.6 | 0 < Tc < 5 · (23 − A) · t/D | 42.0 | X | X | | X | — | Comparative Example |
| 8 | 0.495 | 2.6 | 0.6188 | 2.2 | 0 < Tc < 5 · (23 − A) · t/D | 42.0 | X | X | O | X | — | Comparative Example |
| 9 | 0.42 | 1.8 | 0.525 | 1.6 | 0 < Tc < 8 · (17 − A) · t/D | 37.3 | O | O | O | ◎ | B | Inventive Example |
| 10 | 0.6 | 3 | 0.75 | 2.5 | 0 < Tc < 8 · (17 − A) · t/D | 37.3 | O | O | O | ◎ | B | Inventive Example |
| 11 | 0.495 | 2.6 | 0.6188 | 2.2 | 0 < Tc < 5 · (23 − A) · t/D | 30.0 | O | O | O | ◎ | B | Inventive Example |
| 12 | 0.495 | 2.6 | 0.6188 | 2.2 | 0 < Tc < 5 · (23 − A) · t/D | 30.0 | X | X | O | X | — | Comparative Example |
| 13 | 0.385 | 1.8 | 0.4813 | 1.6 | 0 < Tc < 5 · (23 − A) · t/D | 42.0 | O | O | O | ◎ | B | Inventive Example |
| 14 | 0.385 | 1.8 | 0.4813 | 1.6 | 0 < Tc < 5 · (23 − A) · t/D | 42.0 | X | X | O | X | — | Comparative Example |
| 15 | 0.385 | 1.8 | 0.4813 | 1.6 | 0 < Tc < 5 · (23 − A) · t/D | 69.0 | O | O | O | ◎ | B | Inventive Example |
| 16 | 0.385 | 1.8 | 0.4813 | 1.6 | 0 < Tc < 5 · (23 − A) · t/D | 69.0 | X | X | O | X | — | Comparative Example |
| 17 | 0.385 | 1.8 | 0.4813 | 1.6 | 0 < Tc < 5 · (23 − A) · t/D | 42.0 | O | O | O | ◎ | B | Inventive Example |
| 18 | 0.385 | 1.8 | 0.4813 | 1.6 | 0 < Tc < 5 · (23 − A) · t/D | 42.0 | X | X | O | X | — | Comparative Example |
| 19 | 0.385 | 1.8 | 0.4813 | 1.6 | 0 < Tc < 5 · (23 − A) · t/D | 42.0 | O | O | O | ◎ | B | Inventive Example |
| 20 | 0.385 | 1.8 | 0.4813 | 1.6 | 0 < Tc < 5 · (23 − A) · t/D | 42.0 | X | X | O | X | — | Comparative Example |
| 21 | 0.495 | 2.6 | 0.6188 | 2.2 | 0 < Tc < 5 · (23 − A) · t/D | 30.0 | O | O | O | ◎ | A | Inventive Example |
| 22 | 0.495 | 2.6 | 0.6188 | 2.2 | 0 < Tc < 5 · (23 − A) · t/D | 30.0 | O | O | O | ◎ | A | Inventive Example |
| 23 | 0.495 | 2.6 | 0.6188 | 2.2 | 0 < Tc < 5 · (23 − A) · t/D | 30.0 | O | O | O | ◎ | A | Inventive Example |
| 24 | 0.385 | 1.8 | 0.4813 | 1.6 | 0 < Tc < 5 · (23 − A) · t/D | 69.0 | O | O | O | ◎ | B | Inventive Example |
| 25 | 0.385 | 1.8 | 0.4813 | 1.6 | 0 < Tc < 5 · (23 − A) · t/D | 69.0 | O | O | O | ◎ | A | Inventive Example |

(*1) O: Satisfying the formula.
X: Not satisfying the formula.
(*2) O: No cracking is found in weld.
X: Cracking is found in weld.
(*3) ◎: Diameter of fractured portion is 110% or more of diameter of fused portion.
O: Diameter of fractured portion is 100% or more and less than 110% of diameter of fused portion.
X: Diameter of fractured portion is less than 100% of diameter of fused portion, or interfacial fracture.
(*4) A: In 10 out of 10 samples, ratio of diameter of fractured portion to diameter of fused portion is 115% or more.
B: In 5 to 9 out of 10 samples, ratio of diameter of fractured portion to diameter of fused portion is 115% or more.
C: In 1 to 4 out of 10 samples, ratio of diameter of fractured portion to diameter of fused portion is 115% or more.
(*5) B value: B = 1 + 0.1 · Tc
C value: C = 1 + 0.2 · Tc
(*6) Preferred lower limit of Ip/Im: when 0 < A < 3, (22 + A) · B/80; when 3 ≤ A < 7, (17 + A) · B/64; and when 7 ≤ A < 15, (11 + A) · B/48.
Preferred upper limit of Ip/Im: 1 + 0.15 · Tc when 0 < A < 3, 3 ≤ A < 7, and 7 ≤ A < 15.

TABLE 2-2

| No. | Steel sheet 1 | Steel sheet 2 | Steel sheet 3 | Total sheet thickness t (mm) | Electrode misalignment angle A (degrees) | Tip diameter of electrode D (mm) | Electrode force (kN) | Primary energizing step Current value Im (kA) | Primary energizing step Energizing time (cyc) | Non-energizing step Energization suspension time Tc (cyc) | Secondary energizing step Current value Ip (kA) | Secondary energizing step Energizing time (cyc) | Number of repetitions of non-energizing and secondary energizing steps | Ip/Im | B value (*5) | Formula (I) applied |
|---|---|---|---|---|---|---|---|---|---|---|---|---|---|---|---|---|
| 26 | b | b | — | 2.8 | 5 | 6 | 3.5 | 6.0 | 14 | 1 | 6.6 | 3 | 1 | 1.10 | 1.1 | (17 + A) · B/80 < Ip/Im < C |
| 27 | b | b | — | 2.8 | 5 | 6 | 3.5 | 6.0 | 14 | 4 | 8.0 | 3 | 2 | 1.33 | 1.4 | (17 + A) · B/80 < Ip/Im < C |
| 28 | b | b | — | 2.8 | 5 | 6 | 3.5 | 6.0 | 14 | 4 | 8.0 | 3 | 3 | 1.33 | 1.4 | (17 + A) · B/80 < Ip/Im < C |
| 29 | b | b | — | 2.8 | 5 | 6 | 3.5 | 6.0 | 14 | 4 | 8.0 | 3 | 5 | 1.33 | 1.4 | (17 + A) · B/80 < Ip/Im < C |
| 30 | b | b | — | 2.8 | 5 | 6 | 3.5 | 6.0 | 14 | 4 | 8.0 | 3 | 9 | 1.33 | 1.4 | (17 + A) · B/80 < Ip/Im < C |
| 31 | b | b | — | 2.8 | 5 | 6 | 3.5 | 6.0 | 14 | 4 | 9.5 | 3 | 1 | 1.58 | 1.4 | (17 + A) · B/80 < Ip/Im < C |
| 32 | b | b | — | 2.8 | 5 | 6 | 3.5 | 6.0 | 14 | 4 | 9.9 | 3 | 1 | 1.65 | 1.4 | (17 + A) · B/80 < Ip/Im < C |
| 33 | b | b | — | 2.8 | 5 | 6 | 3.5 | 6.0 | 14 | 0 | 5.9 | 3 | 1 | 0.98 | 1.0 | (17 + A) · B/80 < Ip/Im < C |
| 34 | b | b | — | 2.8 | 5 | 6 | 3.5 | 6.0 | 14 | 4 | 10.8 | 3 | 1 | 1.80 | 1.4 | (17 + A) · B/80 < Ip/Im < C |
| 35 | b | b | — | 2.8 | 5 | 6 | 3.5 | 6.0 | 14 | 4 | 2.2 | 3 | 1 | 0.37 | 1.4 | (17 + A) · B/80 < Ip/Im < C |
| 36 | b | b | — | 2.8 | 5 | 6 | 3.5 | 6.0 | 14 | — | — | — | — | — | — | (17 + A) · B/80 < Ip/Im < C |
| 37 | b | b | — | 2.8 | 5 | 6 | 3.5 | 6.0 | 14 | 0 | 9.5 | 3 | 1 | 1.58 | 1.0 | (17 + A) · B/80 < Ip/Im < C |
| 38 | b | f | — | 2.8 | 5 | 6 | 4.5 | 6.5 | 18 | 4 | 8.0 | 3 | 1 | 1.23 | 1.4 | (17 + A) · B/80 < Ip/Im < C |
| 39 | f | f | — | 2.8 | 5 | 6 | 4.5 | 6.5 | 18 | 4 | 8.0 | 3 | 2 | 1.23 | 1.4 | (17 + A) · B/80 < Ip/Im < C |
| 40 | f | f | — | 2.8 | 5 | 6 | 4.5 | 6.5 | 18 | — | — | — | — | — | — | (17 + A) · B/80 < Ip/Im < C |
| 41 | f | f | — | 2.8 | 5 | 6 | 4.5 | 6.5 | 18 | — | — | — | — | — | — | (17 + A) · B/80 < Ip/Im < C |
| 42 | f | b | — | 2.8 | 0.2 | 5 | 3 | 5.4 | 14 | 4 | 7.2 | 3 | 1 | 1.33 | 1.4 | (22 + A) · B/100 < Ip/Im < C |
| 43 | f | b | — | 2.8 | 0.2 | 5 | 3 | 5.4 | 14 | 4 | 8.5 | 3 | 1 | 1.57 | 1.4 | (22 + A) · B/100 < Ip/Im < C |
| 44 | f | b | — | 2.8 | 0.2 | 5 | 3 | 5.4 | 14 | 4 | 9.0 | 3 | 1 | 1.67 | 1.4 | (22 + A) · B/100 < Ip/Im < C |
| 45 | b | b | — | 2.8 | 0.2 | 5 | 3 | 5.4 | 14 | 4 | 7.2 | 3 | 2 | 1.33 | 1.4 | (22 + A) · B/100 < Ip/Im < C |
| 46 | b | g | — | 3.2 | 3 | 8 | 6 | 4.7 | 14 | 6 | 5.0 | 3 | 1 | 1.06 | 1.6 | (17 + A) · B/80 < Ip/Im < C |
| 47 | b | g | — | 3.2 | 3 | 8 | 6 | 4.7 | 14 | 6 | 8.7 | 3 | 1 | 1.85 | 1.6 | (17 + A) · B/80 < Ip/Im < C |
| 48 | g | g | — | 3.2 | 3 | 8 | 6 | 4.7 | 14 | 6 | 9.2 | 3 | 1 | 1.96 | 1.6 | (17 + A) · B/80 < Ip/Im < C |
| 49 | g | g | — | 3.2 | 3 | 8 | 6 | 4.7 | 14 | 6 | 5.0 | 3 | 2 | 1.06 | 1.6 | (17 + A) · B/80 < Ip/Im < C |
| 50 | g | g | — | 3.2 | 3 | 8 | 6 | 4.7 | 14 | 6 | 11.0 | 3 | 1 | 2.34 | 1.6 | (17 + A) · B/80 < Ip/Im < C |
| 51 | g | g | — | 3.2 | 3 | 8 | 6 | 4.7 | 14 | 6 | 2.5 | 10 | 1 | 0.53 | 1.6 | (17 + A) · B/80 < Ip/Im < C |
| 52 | g | g | — | 3.2 | 3 | 8 | 6 | 4.7 | 14 | 6 | 2.3 | 10 | 1 | 0.49 | 1.6 | (17 + A) · B/80 < Ip/Im < C |
| 53 | g | g | — | 3.2 | 3 | 8 | 6 | 4.7 | 14 | 6 | 1.8 | 10 | 1 | 0.38 | 1.6 | (17 + A) · B/80 < Ip/Im < C |
| 54 | g | h | — | 4.0 | 8 | 6 | 7 | 7.0 | 24 | 5 | 7.2 | 3 | 1 | 1.03 | 1.5 | (11 + A) · B/60 < Ip/Im < C |
| 55 | h | h | — | 4.0 | 8 | 6 | 7 | 7.0 | 24 | 5 | 7.2 | 3 | 3 | 1.03 | 1.5 | (11 + A) · B/60 < Ip/Im < C |
| 56 | h | h | — | 4.0 | 8 | 6 | 7 | 7.0 | 24 | 5 | 7.2 | 3 | 5 | 1.03 | 1.5 | (11 + A) · B/60 < Ip/Im < C |
| 57 | h | h | — | 4.0 | 8 | 6 | 7 | 7.0 | 24 | 5 | 7.2 | 3 | 9 | 1.03 | 1.5 | (11 + A) · B/60 < Ip/Im < C |
| 58 | h | h | — | 4.0 | 8 | 6 | 7 | 7.0 | 24 | 5 | 9.0 | 3 | 1 | 1.29 | 1.5 | (11 + A) · B/60 < Ip/Im < C |
| 59 | h | h | — | 4.0 | 8 | 6 | 7 | 7.0 | 24 | 5 | 9.0 | 3 | 2 | 1.29 | 1.5 | (11 + A) · B/60 < Ip/Im < C |
| 60 | h | h | — | 4.0 | 8 | 6 | 7 | 7.0 | 24 | 5 | 12.0 | 3 | 1 | 1.71 | 1.5 | (11 + A) · B/60 < Ip/Im < C |

TABLE 2-2-continued

| No. | Lower limit of Ip/Im in formula (I) applied | Upper limit of Ip/Im in formula (I) applied (C value) (*5) | Preferred lower limit of Ip/Im in formula (I) applied (*6) | Preferred upper limit of Ip/Im in formula (I) applied (*6) | Formula (II) applied | Right-hand side of formula (II) applied (cyc) | Formula (I) (*1) | Preferred range of formula (I) (*1) | Formula (II) (*1) | Presence of cracking (*2) | Fracture mode during cross tension test (*3) | Stability of fracture mode (*4) | Remarks |
|---|---|---|---|---|---|---|---|---|---|---|---|---|---|
| 26 | 0.3025 | 1.2 | 0.3781 | 1.15 | $0 < Tc < 5 \cdot (23 - A) \cdot t/D$ | 42.0 | ○ | ○ | ○ | ○ | ◎ | B | Inventive Example |
| 27 | 0.385 | 1.8 | 0.4813 | 1.6 | $0 < Tc < 5 \cdot (23 - A) \cdot t/D$ | 42.0 | ○ | ○ | ○ | ○ | ◎ | B | Inventive Example |
| 28 | 0.385 | 1.8 | 0.4813 | 1.6 | $0 < Tc < 5 \cdot (23 - A) \cdot t/D$ | 42.0 | ○ | ○ | ○ | ○ | ◎ | A | Inventive Example |
| 29 | 0.385 | 1.8 | 0.4813 | 1.6 | $0 < Tc < 5 \cdot (23 - A) \cdot t/D$ | 42.0 | ○ | ○ | ○ | ○ | ◎ | A | Inventive Example |
| 30 | 0.385 | 1.8 | 0.4813 | 1.6 | $0 < Tc < 5 \cdot (23 - A) \cdot t/D$ | 42.0 | ○ | ○ | ○ | ○ | ◎ | A | Inventive Example |
| 31 | 0.385 | 1.8 | 0.4813 | 1.6 | $0 < Tc < 5 \cdot (23 - A) \cdot t/D$ | 42.0 | ○ | ○ | ○ | ○ | ◎ | B | Inventive Example |
| 32 | 0.385 | 1.8 | 0.4813 | 1.6 | $0 < Tc < 5 \cdot (23 - A) \cdot t/D$ | 42.0 | ○ | ○ | ○ | ○ | ○ | C | Inventive Example |
| 33 | 0.275 | 1 | 0.3438 | 1 | $0 < Tc < 5 \cdot (23 - A) \cdot t/D$ | 42.0 | × | × | × | × | × | — | Comparative Example |
| 34 | 0.385 | 1.8 | 0.4813 | 1.6 | $0 < Tc < 5 \cdot (23 - A) \cdot t/D$ | 42.0 | ○ | ○ | ○ | × | × | — | Comparative Example |
| 35 | 0.385 | 1.8 | 0.4813 | 1.6 | $0 < Tc < 5 \cdot (23 - A) \cdot t/D$ | 42.0 | ○ | ○ | ○ | × | × | — | Comparative Example |
| 36 | N/A | N/A | N/A | N/A | $0 < Tc < 5 \cdot (23 - A) \cdot t/D$ | 42.0 | × | × | × | × | × | — | Comparative Example |
| 37 | 0.275 | 1 | 0.3438 | 1 | $0 < Tc < 5 \cdot (23 - A) \cdot t/D$ | 42.0 | ○ | × | ○ | ○ | ◎ | B | Inventive Example |
| 38 | 0.385 | 1.8 | 0.4813 | 1.6 | $0 < Tc < 5 \cdot (23 - A) \cdot t/D$ | 42.0 | ○ | ○ | ○ | ○ | ◎ | A | Inventive Example |
| 39 | 0.385 | 1.8 | 0.4813 | 1.6 | $0 < Tc < 5 \cdot (23 - A) \cdot t/D$ | 42.0 | ○ | ○ | ○ | ○ | ◎ | A | Inventive Example |
| 40 | N/A | N/A | N/A | N/A | $0 < Tc < 5 \cdot (23 - A) \cdot t/D$ | 42.0 | × | × | × | × | × | — | Comparative Example |
| 41 | N/A | N/A | N/A | N/A | $0 < Tc < 5 \cdot (23 - A) \cdot t/D$ | 42.0 | × | × | × | × | × | — | Comparative Example |
| 42 | 0.3108 | 1.8 | 0.3885 | 1.6 | $0 < Tc < 5 \cdot (103 - A) \cdot t/D$ | 57.6 | ○ | ○ | ○ | ○ | ◎ | B | Inventive Example |
| 43 | 0.3108 | 1.8 | 0.3885 | 1.6 | $0 < Tc < 5 \cdot (103 - A) \cdot t/D$ | 57.6 | ○ | ○ | ○ | ○ | ◎ | B | Inventive Example |
| 44 | 0.3108 | 1.8 | 0.3885 | 1.6 | $0 < Tc < 5 \cdot (103 - A) \cdot t/D$ | 57.6 | ○ | ○ | ○ | ○ | ◎ | C | Inventive Example |
| 45 | 0.3108 | 1.8 | 0.3885 | 1.6 | $0 < Tc < 5 \cdot (103 - A) \cdot t/D$ | 57.6 | ○ | ○ | ○ | ○ | ◎ | A | Inventive Example |
| 46 | 0.4 | 2.2 | 0.5 | 1.9 | $0 < Tc < 5 \cdot (23 - A) \cdot t/D$ | 40.0 | ○ | ○ | ○ | ○ | ◎ | B | Inventive Example |
| 47 | 0.4 | 2.2 | 0.5 | 1.9 | $0 < Tc < 5 \cdot (23 - A) \cdot t/D$ | 40.0 | ○ | ○ | ○ | ○ | ◎ | B | Inventive Example |
| 48 | 0.4 | 2.2 | 0.5 | 1.9 | $0 < Tc < 5 \cdot (23 - A) \cdot t/D$ | 40.0 | ○ | ○ | ○ | ○ | ◎ | C | Inventive Example |
| 49 | 0.4 | 2.2 | 0.5 | 1.9 | $0 < Tc < 5 \cdot (23 - A) \cdot t/D$ | 40.0 | ○ | ○ | ○ | ○ | ◎ | A | Inventive Example |
| 50 | 0.4 | 2.2 | 0.5 | 1.9 | $0 < Tc < 5 \cdot (23 - A) \cdot t/D$ | 40.0 | ○ | ○ | × | × | × | — | Comparative Example |
| 51 | 0.4 | 2.2 | 0.5 | 1.9 | $0 < Tc < 5 \cdot (23 - A) \cdot t/D$ | 40.0 | ○ | × | ○ | ○ | ◎ | C | Inventive Example |
| 52 | 0.4 | 2.2 | 0.5 | 1.9 | $0 < Tc < 5 \cdot (23 - A) \cdot t/D$ | 40.0 | ○ | × | ○ | ○ | ○ | — | Inventive Example |
| 53 | 0.4 | 2.2 | 0.5 | 1.9 | $0 < Tc < 5 \cdot (23 - A) \cdot t/D$ | 40.0 | ○ | × | ○ | × | × | — | Comparative Example |
| 54 | 0.475 | 2 | 0.5938 | 1.75 | $0 < Tc < 8 \cdot (17 - A) \cdot t/D$ | 48.0 | ○ | ○ | ○ | ○ | ◎ | B | Inventive Example |
| 55 | 0.475 | 2 | 0.5938 | 1.75 | $0 < Tc < 8 \cdot (17 - A) \cdot t/D$ | 48.0 | ○ | ○ | ○ | ○ | ◎ | A | Inventive Example |
| 56 | 0.475 | 2 | 0.5938 | 1.75 | $0 < Tc < 8 \cdot (17 - A) \cdot t/D$ | 48.0 | ○ | ○ | ○ | ○ | ◎ | A | Inventive Example |

TABLE 2-2-continued

| | | | | | | | | | | | | |
|---|---|---|---|---|---|---|---|---|---|---|---|---|
| 57 | 0.475 | 2 | 0.5938 | 1.75 | 0 < Tc < 8 · (17 − A) · t/D | 48.0 | ○ | ○ | ○ | ◎ | A | Inventive Example |
| 58 | 0.475 | 2 | 0.5938 | 1.75 | 0 < Tc < 8 · (17 − A) · t/D | 48.0 | ○ | ○ | ○ | ◎ | B | Inventive Example |
| 59 | 0.475 | 2 | 0.5938 | 1.75 | 0 < Tc < 8 · (17 − A) · t/D | 48.0 | ○ | ○ | ○ | ◎ | A | Inventive Example |
| 60 | 0.475 | 2 | 0.5938 | 1.75 | 0 < Tc < 8 · (17 − A) · t/D | 48.0 | ○ | ○ | ○ | ◎ | B | Inventive Example |

(*1) ○: Satisfying the formula.
X: Not satisfying the formula.
(*2) ○: No cracking is found in weld.
X: Cracking is found in weld.
(*3) ◎: Diameter of fractured portion is 110% or more of diameter of fused portion.
○: Diameter of fractured portion is 100% or more and less than 110% of diameter of fused portion.
X: Diameter of fractured portion is less than 100% of diameter of fused portion, or interfacial fracture.
(*4) A: In 10 out of 10 samples, ratio of diameter of fractured portion to diameter of fused portion is 115% or more.
B: In 5 to 9 out of 10 samples, ratio of diameter of fractured portion to diameter of fused portion is 115% or more.
C: In 1 to 4 out of 10 samples, ratio of diameter of fractured portion to diameter of fused portion is 115% or more.
(*5) B value: B = 1 + 0.1 · Tc
C value: C = 1 + 0.2 · Tc
(*6) Preferred lower limit of Ip/Im: when $0 < A < 3$, $(22 + A) \cdot B/80$; when $3 \leq A < 7$, $(17 + A) \cdot B/64$; and when $7 \leq A < 15$, $(11 + A) \cdot B/48$.
Preferred upper limit of Ip/Im: $1 + 0.15 \cdot$ Tc when $0 < A < 3$, $3 \leq A < 7$, and $7 \leq A < 15$.

TABLE 2-3

| No. | Steel sheet 1 | Steel sheet 2 | Steel sheet 3 | Total sheet thickness t (mm) | Electrode misalignment angle A (degrees) | Tip diameter of electrode D (mm) | Electrode force (kN) | Primary energizing step Current value Im (kA) | Primary energizing step Energizing time (cyc) | Non-energizing step Energization suspension time Tc (cyc) | Secondary energizing step Current value Ip (kA) | Secondary energizing step Energizing time (cyc) | Number of repetitions of non-energizing and secondary energizing steps | Ip/Im | B value (*5) | Formula (I) applied |
|---|---|---|---|---|---|---|---|---|---|---|---|---|---|---|---|---|
| 61 | h | h | — | 4.0 | 8 | 6 | 7 | 7.0 | 24 | 5 | 12.5 | 3 | 1 | 1.79 | 1.5 | (I1 + A) · B/60 < Ip/Im < C |
| 62 | h | h | — | 4.0 | 8 | 6 | 7 | 7.0 | 24 | 5 | 14.2 | 3 | 1 | 2.03 | 1.5 | (I1 + A) · B/60 < Ip/Im < C |
| 63 | h | h | — | 4.0 | 8 | 6 | 7 | 7.0 | 24 | 5 | 4.0 | 10 | 1 | 0.57 | 1.5 | (I1 + A) · B/60 < Ip/Im < C |
| 64 | h | h | — | 4.0 | 8 | 6 | 7 | 7.0 | 24 | 5 | 3.4 | 10 | 1 | 0.49 | 1.5 | (I1 + A) · B/60 < Ip/Im < C |
| 65 | h | h | — | 4.0 | 8 | 6 | 7 | 7.0 | 24 | 5 | 2.0 | 10 | 1 | 0.29 | 1.5 | (I1 + A) · B/60 < Ip/Im < C |
| 66 | h | h | i | 6.0 | 5 | 6 | 5.5 | 6.0 | 30 | 5 | 8.0 | 3 | 1 | 1.33 | 1.8 | (I7 + A) · B/80 < Ip/Im < C |
| 67 | h | h | i | 6.0 | 5 | 6 | 5.5 | 6.0 | 30 | 8 | 8.0 | 3 | 2 | 1.33 | 1.8 | (I7 + A) · B/80 < Ip/Im < C |
| 68 | h | h | i | 6.0 | 5 | 6 | 5.5 | 6.0 | 30 | — | — | — | 1 | — | — | (I7 + A) · B/80 < Ip/Im < C |
| 69 | b | b | b | 4.2 | 14 | 6 | 6.3 | 6.0 | 40 | 4 | 6.5 | 3 | 1 | 1.08 | 1.4 | (I1 + A) · B/60 < Ip/Im < C |
| 70 | b | b | b | 4.2 | 14 | 6 | 6.3 | 6.0 | 40 | 6 | 8.0 | 3 | 1 | 1.33 | 1.6 | (I1 + A) · B/60 < Ip/Im < C |
| 71 | b | b | b | 4.2 | 14 | 6 | 6.3 | 6.0 | 40 | 6 | 8.0 | 3 | 2 | 1.33 | 1.6 | (I1 + A) · B/60 < Ip/Im < C |
| 72 | b | b | b | 4.2 | 14 | 6 | 6.3 | 6.0 | 40 | — | — | — | 1 | — | — | (I1 + A) · B/60 < Ip/Im < C |
| 73 | i | i | — | 3.2 | 10 | 6 | 6 | 7.0 | 14 | 6 | 10.5 | 3 | 2 | 1.50 | 1.6 | (I1 + A) · B/60 < Ip/Im < C |
| 74 | i | i | — | 3.2 | 10 | 6 | 6 | 7.0 | 14 | 6 | 4.0 | 3 | 2 | 0.57 | 1.6 | (I1 + A) · B/60 < Ip/Im < C |
| 75 | i | i | — | 3.2 | 10 | 6 | 6 | 7.0 | 14 | 4 | 16 | 3 | 1 | 2.29 | 1.6 | (I7 + A) · B/80 < Ip/Im < C |
| 76 | k | k | — | 3.0 | 6 | 6 | 6 | 5.3 | 14 | 4 | 6.5 | 3 | 2 | 1.23 | 1.4 | (I1 + A) · B/60 < Ip/Im < C |
| 77 | k | k | — | 3.0 | 6 | 6 | 6 | 5.3 | 14 | 4 | 6.5 | 3 | 3 | 1.23 | 1.4 | (I7 + A) · B/80 < Ip/Im < C |
| 78 | k | k | — | 3.0 | 6 | 6 | 6 | 5.3 | 14 | 4 | 6.5 | 3 | 5 | 1.23 | 1.4 | (I7 + A) · B/80 < Ip/Im < C |
| 79 | k | k | — | 3.0 | 6 | 6 | 6 | 5.3 | 14 | 4 | 6.5 | 3 | 9 | 1.23 | 1.4 | (I7 + A) · B/80 < Ip/Im < C |
| 80 | k | k | — | 3.0 | 6 | 6 | 6 | 5.3 | 14 | 4 | 2.0 | 3 | 1 | 0.38 | 1.4 | (I1 + A) · B/60 < Ip/Im < C |
| 81 | k | k | — | 3.0 | 6 | 6 | 6 | 5.3 | 14 | 4 | 12.5 | 3 | 1 | 2.36 | 1.4 | (I7 + A) · B/80 < Ip/Im < C |
| 82 | l | l | — | 3.6 | 9 | 6 | 6 | 6.2 | 30 | 4 | 7.4 | 3 | 1 | 1.19 | 1.4 | (I1 + A) · B/60 < Ip/Im < C |
| 83 | l | l | — | 3.6 | 9 | 6 | 6 | 6.2 | 30 | 4 | 7.4 | 3 | 3 | 1.19 | 1.4 | (I1 + A) · B/60 < Ip/Im < C |
| 84 | l | l | — | 3.6 | 9 | 6 | 6 | 6.2 | 30 | 4 | 7.4 | 3 | 5 | 1.19 | 1.4 | (I1 + A) · B/60 < Ip/Im < C |
| 85 | l | l | — | 3.6 | 9 | 6 | 6 | 6.2 | 30 | 4 | 7.4 | 3 | 9 | 1.19 | 1.4 | (I1 + A) · B/60 < Ip/Im < C |
| 86 | l | l | — | 3.6 | 9 | 6 | 6 | 6.2 | 30 | 4 | 2.0 | 3 | 1 | 0.32 | 1.4 | (I1 + A) · B/60 < Ip/Im < C |
| 87 | l | l | — | 3.6 | 9 | 6 | 6 | 6.2 | 30 | 4 | 12.5 | 3 | 1 | 2.02 | 1.4 | (I7 + A) · B/80 < Ip/Im < C |
| 88 | l | l | — | 2.8 | 7 | 6 | 4 | 5.6 | 18 | 5 | 6 | 3 | 1 | 1.07 | 1.5 | (I1 + A) · B/60 < Ip/Im < C |
| 89 | b | c | — | 2.8 | 7 | 6 | 4 | 5.6 | 18 | 5 | 8 | 3 | 1 | 1.43 | 1.5 | (I1 + A) · B/60 < Ip/Im < C |
| 90 | b | c | — | 2.8 | 7 | 6 | 4 | 5.6 | 18 | 5 | 8.0 | 3 | 3 | 1.43 | 1.5 | (I1 + A) · B/60 < Ip/Im < C |
| 91 | b | c | — | 2.8 | 7 | 6 | 4 | 5.6 | 18 | 5 | 8.0 | 3 | 5 | 1.43 | 1.5 | (I1 + A) · B/60 < Ip/Im < C |
| 92 | b | c | — | 2.8 | 7 | 6 | 4 | 5.6 | 18 | 5 | 10 | 3 | 1 | 1.79 | 1.5 | (I1 + A) · B/60 < Ip/Im < C |
| 93 | b | c | — | 2.8 | 7 | 6 | 4 | 5.6 | 18 | 5 | 12.0 | 3 | 1 | 2.14 | 1.5 | (I1 + A) · B/60 < Ip/Im < C |
| 94 | b | c | — | 2.8 | 7 | 6 | 4 | 5.6 | 18 | — | — | — | — | — | — | (I1 + A) · B/60 < Ip/Im < C |

TABLE 2-3-continued

| No. | Lower limit of Ip/Im in formula (I) applied | Upper limit of Ip/Im in formula (I) applied (C value) (*5) | Preferred lower limit of Ip/Im in formula (I) applied (*6) | Preferred upper limit of Ip/Im in formula (I) applied (*6) | Formula (II) applied | Right-hand side of formula (II) applied (cyc) | Formula (I) (*1) | Preferred range of formula (I) (*1) | Formula (II) (*1) | Presence of cracking (*2) | Fracture mode during cross tension test (*3) | Stability of fracture mode (*4) | Remarks |
|---|---|---|---|---|---|---|---|---|---|---|---|---|---|
| 61 | 0.475 | 2 | 0.5938 | 1.75 | 0 < Tc < 8 · (17 − A) · t/D | 48.0 | ○ | X | ○ | ○ | ⊚ | C | Inventive Example |
| 62 | 0.475 | 2 | 0.5938 | 1.75 | 0 < Tc < 8 · (17 − A) · t/D | 48.0 | X | X | ○ | X | X | — | Comparative Example |
| 63 | 0.475 | 2 | 0.5938 | 1.75 | 0 < Tc < 8 · (17 − A) · t/D | 48.0 | ○ | X | ○ | ○ | ⊚ | C | Inventive Example |
| 64 | 0.475 | 2 | 0.5938 | 1.75 | 0 < Tc < 8 · (17 − A) · t/D | 48.0 | ○ | X | ○ | ○ | ○ | C | Inventive Example |
| 65 | 0.475 | 2 | 0.5938 | 1.75 | 0 < Tc < 8 · (17 − A) · t/D | 48.0 | X | X | ○ | X | X | — | Comparative Example |
| 66 | 0.495 | 2.6 | 0.6188 | 2.2 | 0 < Tc < 8 · (17 − A) · t/D | 90.0 | ○ | ○ | ○ | ○ | ⊚ | B | Inventive Example |
| 67 | 0.495 | 2.6 | 0.6188 | 2.2 | 0 < Tc < 8 · (17 − A) · t/D | 90.0 | ○ | ○ | ○ | ○ | ⊚ | A | Inventive Example |
| 68 | N/A | N/A | N/A | N/A | 0 < Tc < 5 · (23 − A) · t/D | 90.0 | X | X | X | X | X | — | Comparative Example |
| 69 | 0.5833 | 1.8 | 0.7292 | 1.6 | 0 < Tc < 5 · (23 − A) · t/D | 16.8 | ○ | ○ | ○ | ○ | ⊚ | B | Inventive Example |
| 70 | 0.6667 | 2.2 | 0.8333 | 1.9 | 0 < Tc < 8 · (17 − A) · t/D | 16.8 | ○ | ○ | ○ | ○ | ⊚ | B | Inventive Example |
| 71 | 0.6667 | 2.2 | 0.8333 | 1.9 | 0 < Tc < 8 · (17 − A) · t/D | 16.8 | ○ | ○ | ○ | ○ | ⊚ | A | Inventive Example |
| 72 | N/A | N/A | N/A | N/A | 0 < Tc < 8 · (17 − A) · t/D | 16.8 | X | X | X | X | X | — | Comparative Example |
| 73 | 0.56 | 2.2 | 0.7 | 1.9 | 0 < Tc < 8 · (17 − A) · t/D | 29.9 | ○ | ○ | ○ | ○ | ⊚ | B | Inventive Example |
| 74 | 0.56 | 2.2 | 0.7 | 1.9 | 0 < Tc < 8 · (17 − A) · t/D | 29.9 | ○ | ○ | ○ | ○ | ○ | — | Inventive Example |
| 75 | 0.56 | 2.2 | 0.7 | 1.9 | 0 < Tc < 8 · (17 − A) · t/D | 29.9 | X | X | X | X | X | — | Comparative Example |
| 76 | 0.4025 | 1.8 | 0.5031 | 1.6 | 0 < Tc < 5 · (23 − A) · t/D | 42.5 | ○ | ○ | ○ | ○ | ⊚ | B | Inventive Example |
| 77 | 0.4025 | 1.8 | 0.5031 | 1.6 | 0 < Tc < 5 · (23 − A) · t/D | 42.5 | ○ | ○ | ○ | ○ | ⊚ | B | Inventive Example |
| 78 | 0.4025 | 1.8 | 0.5031 | 1.6 | 0 < Tc < 5 · (23 − A) · t/D | 42.5 | ○ | ○ | ○ | ○ | ⊚ | A | Inventive Example |
| 79 | 0.4025 | 1.8 | 0.5031 | 1.6 | 0 < Tc < 5 · (23 − A) · t/D | 42.5 | ○ | ○ | ○ | ○ | ○ | A | Inventive Example |
| 80 | 0.4025 | 1.8 | 0.5031 | 1.6 | 0 < Tc < 5 · (23 − A) · t/D | 42.5 | X | X | X | X | X | — | Comparative Example |
| 81 | 0.4667 | 1.8 | 0.5833 | 1.6 | 0 < Tc < 5 · (23 − A) · t/D | 38.4 | X | X | X | X | X | — | Comparative Example |
| 82 | 0.4667 | 1.8 | 0.5833 | 1.6 | 0 < Tc < 8 · (17 − A) · t/D | 38.4 | ○ | ○ | ○ | ○ | ⊚ | B | Inventive Example |
| 83 | 0.4667 | 1.8 | 0.5833 | 1.6 | 0 < Tc < 8 · (17 − A) · t/D | 38.4 | ○ | ○ | ○ | ○ | ⊚ | B | Inventive Example |
| 84 | 0.4667 | 1.8 | 0.5833 | 1.6 | 0 < Tc < 8 · (17 − A) · t/D | 38.4 | ○ | ○ | ○ | ○ | ⊚ | A | Inventive Example |
| 85 | 0.4667 | 1.8 | 0.5833 | 1.6 | 0 < Tc < 8 · (17 − A) · t/D | 38.4 | ○ | ○ | ○ | ○ | ○ | A | Inventive Example |
| 86 | 0.4667 | 1.8 | 0.5833 | 1.6 | 0 < Tc < 8 · (17 − A) · t/D | 38.4 | X | X | X | X | X | — | Comparative Example |
| 87 | 0.4667 | 1.8 | 0.5833 | 1.6 | 0 < Tc < 8 · (17 − A) · t/D | 38.4 | ○ | X | ○ | ○ | ○ | — | Comparative Example |
| 88 | 0.45 | 2 | 0.5625 | 1.75 | 0 < Tc < 8 · (17 − A) · t/D | 37.3 | ○ | ○ | ○ | ○ | ⊚ | B | Inventive Example |
| 89 | 0.45 | 2 | 0.5625 | 1.75 | 0 < Tc < 8 · (17 − A) · t/D | 37.3 | ○ | ○ | ○ | ○ | ⊚ | B | Inventive Example |
| 90 | 0.45 | 2 | 0.5625 | 1.75 | 0 < Tc < 8 · (17 − A) · t/D | 37.3 | ○ | ○ | ○ | ○ | ⊚ | A | Inventive Example |

TABLE 2-3-continued

| | | | | | | | | | | | | |
|---|---|---|---|---|---|---|---|---|---|---|---|---|
| 91 | 0.45 | 2 | 0.5625 | 1.75 | 0 < Tc < 8 · (17 − A) · t/D | 37.3 | ○ | ○ | ○ | ○ | ◎ | A | Inventive Example |
| 92 | 0.45 | 2 | 0.5625 | 1.75 | 0 < Tc < 8 · (17 − A) · t/D | 37.3 | ○ | ○ | ○ | ○ | ○ | — | Inventive Example |
| 93 | 0.45 | 2 | 0.5625 | 1.75 | 0 < Tc < 8 · (17 − A) · t/D | 37.3 | X | X | X | X | X | — | Comparative Example |
| 94 | N/A | N/A | N/A | N/A | 0 < Tc < 8 · (17 − A) · t/D | 37.3 | X | X | X | X | X | — | Comparative Example |

(*1) ○: Satisfying the formula.
X: Not satisfying the formula.
(*2) ○: No cracking is found in weld.
X: Cracking is found in weld.
(*3) ◎: Diameter of fractured portion is 110% or more of diameter of fused portion.
○: Diameter of fractured portion is 100% or more and less than 110% of diameter of fused portion.
X: Diameter of fractured portion is less than 100% of diameter of fused portion, or interfacial fracture.
(*4) A: In 10 out of 10 samples, ratio of diameter of fractured portion to diameter of fused portion is 115% or more.
B: In 5 to 9 out of 10 samples, ratio of diameter of fractured portion to diameter of fused portion is 115% or more.
C: In 1 to 4 out of 10 samples, ratio of diameter of fractured portion to diameter of fused portion is 115% or more.
(*5) B value: B = 1 + 0.1 · Tc
C value: C = 1 + 0.2 · Tc
(*6) Preferred lower limit of Ip/Im: when 0 < A < 3, (22 + A) · B/80; when 3 ≤ A < 7, (17 + A) · B/64; and when 7 ≤ A < 15, (11 + A) · B/48.
Preferred upper limit of Ip/Im: 1 + 0.15 · Tc when 0 < A < 3, 3 ≤ A < 7, and 7 ≤ A < 15.

REFERENCE SIGNS LIST 1, 2 steel sheet
3, 4 electrode
5 weld (nugget)

The invention claimed is:

1. A resistance spot welding method for joining a sheet set including a plurality of lapped steel sheets, the method comprising: holding the sheet set between a pair of electrodes; and energizing the sheet set under application of electrode force to thereby join the steel sheets together, wherein at least one of the plurality of lapped steel sheets is a surface-treated steel sheet including a metal coating layer on a surface thereof, wherein the energizing comprises a primary energizing step of performing energization to form a nugget portion, a non-energizing step in which, after the primary energizing step, the energization is suspended for an energization suspension time Tc (cycles), and a secondary energizing step of, after the non-energizing step, performing energization for reheating while the nugget portion is prevented from growing, and wherein, during the energizing, the relations of the following formula (I) are satisfied:

$(22+A) \cdot B/100 < Ip/Im < C$ when $0 < A < 3$, $(17+A) \cdot B/80 < Ip/Im < C$ when $3 \leq A < 7$, and $(11+A) \cdot B/60 < Ip/Im < C$ when $7 \leq A < 15$,  formula (I)

where A is an electrode misalignment angle (degrees) of the electrodes, Im is a current value (kA) in the primary energizing step, Ip is a current value (kA) in the secondary energizing step, B is a variable defined as $1+0.1 \cdot Tc$, and C is a variable defined as $1+0.2 \cdot Tc$.

2. The resistance spot welding method according to claim 1, wherein, in the non-energizing step, the relations of the following formula (II) are satisfied:

$0 < Tc < (103-A) \cdot t/D$ when $0 < A < 3$, $0 < Tc < 5 \cdot (23-A) \cdot t/D$ when $3 \leq A < 7$, and $0 < Tc < 8 \cdot (17-A) \cdot t/D$ when $7 \leq A < 15$,  formula (II)

where t is the total thickness (mm) of the plurality of lapped steel sheets, and D is the tip diameter (mm) of the electrodes.

3. The resistance spot welding method according to claim 1, wherein, after the primary energizing step, the non-energizing step and the secondary energizing step are repeated in this order at least twice.

4. The resistance spot welding method according to claim 1, wherein at least one of the plurality of lapped steel sheets has a tensile strength of 590 MPa or more.

5. The resistance spot welding method according to claim 2, wherein, after the primary energizing step, the non-energizing step and the secondary energizing step are repeated in this order at least twice.

6. The resistance spot welding method according to claim 2, wherein at least one of the plurality of lapped steel sheets has a tensile strength of 590 MPa or more.

7. The resistance spot welding method according to claim 3, wherein at least one of the plurality of lapped steel sheets has a tensile strength of 590 MPa or more.

8. The resistance spot welding method according to claim 5, wherein at least one of the plurality of lapped steel sheets has a tensile strength of 590 MPa or more.

* * * * *